(12) United States Patent
Marks et al.

(10) Patent No.: US 8,375,885 B2
(45) Date of Patent: Feb. 19, 2013

(54) BLISTER PACKAGE ASSEMBLY AND METHOD AND SYSTEM FOR MANUFACTURING THE SAME

(75) Inventors: Paul Marks, Markam (CA); Michael J. Markiewicz, Foxboro (CA)

(73) Assignee: Indsale Limited, Foxboro, Ontario (CA)

( * ) Notice: Subject to any disclaimer, the term of this patent is extended or adjusted under 35 U.S.C. 154(b) by 999 days.

(21) Appl. No.: 12/393,552

(22) Filed: Feb. 26, 2009

(65) Prior Publication Data

US 2009/0220687 A1 Sep. 3, 2009

Related U.S. Application Data

(60) Provisional application No. 61/031,398, filed on Feb. 26, 2008.

(51) Int. Cl.
*B05B 7/00* (2006.01)
*B05B 11/00* (2006.01)
*B05C 13/00* (2006.01)
*B05D 5/10* (2006.01)

(52) U.S. Cl. ............ 118/300; 118/71; 118/46; 118/641; 427/207.1

(58) Field of Classification Search ................... None
See application file for complete search history.

(56) References Cited

U.S. PATENT DOCUMENTS

| | | | | | |
|---|---|---|---|---|---|
| 4,845,921 | A | * | 7/1989 | Miselli | 53/453 |
| 4,955,783 | A | * | 9/1990 | Grazia | 414/795 |
| 5,014,851 | A | | 5/1991 | Wick | |
| 5,054,271 | A | * | 10/1991 | DeWoskin | 53/559 |
| 5,623,816 | A | * | 4/1997 | Edwards et al. | 53/478 |
| 6,604,342 | B1 | * | 8/2003 | Appelbaum | 53/471 |
| 2006/0005764 | A1 | * | 1/2006 | Walsh et al. | 118/313 |

* cited by examiner

*Primary Examiner* — Dah-Wei Yuan
*Assistant Examiner* — Charles Capozzi
(74) *Attorney, Agent, or Firm* — Christopher & Weisberg, P.A.

(57) ABSTRACT

A system and method for providing adhesive to a pre-formed blister tray having shoulders and recesses between the shoulders, the system having at least one pallet, each pallet of the at least one pallet having with holes to accommodate recesses within the blister tray and support for the shoulders of the blister tray; a pallet loading station for loading the pallet with the pre-formed blister tray; a printer unit for printing adhesive to the shoulders of the blister tray; a drying station for drying the adhesive; and an unloading station for unloading blister trays with adhesive printed on the shoulders thereof. Further a pallet for use in the system.

14 Claims, 10 Drawing Sheets

BLISTER PACKAGE ASSEMBLY AND METHOD AND SYSTEM FOR MANUFACTURING THE SAME

CROSS-REFERENCE TO RELATED APPLICATION

This application is related to and claims priority to U.S. Provisional Patent Application Ser. No. 61/031,398, filed Feb. 26, 2008 entitled BLISTER PACKAGE ASSEMBLY AND METHOD AND SYSTEM FOR MANUFACTURING THE SAME, the entirety of which is incorporated herein by reference.

FIELD OF THE INVENTION

The present disclosure relates to blister packaging and methods and systems for making the same, and in particular to blister packaging for use with cohesive pressure sealing techniques.

BACKGROUND OF THE INVENTION

Blister packages are used for a variety of purposes including packaging of small items such as pharmaceuticals, electronics, contact lenses, among others. These packages typically consist of a blister tray having a recessed portion and shoulder portions, and a lidding sheet that is adhered to the blister tray portion. In some cases, an intermediary adhesive sheet is also included between the lidding sheet and the blister sheet.

In various applications, the lidding sheet is provided with an adhesive in order to adhere to the blister tray. This, however, is problematic when the lidding sheet also needs to be capable of being printed on. Running a lidding sheet through a printer, where the lidding sheet includes an adhesive, could jam the printer or could ruin the printer by leaving adhesive within the printer. Alternatives to this include: providing a layer over the adhesive, which can be peeled away prior to the adhesion of the blister tray to the lidding sheet. However, this results in a very thick lidding sheet that makes it difficult to access the blister. In order to facilitate access to the blister container, perforations are often added to the lidding sheet, which could result in the loss of a hermetic seal for some applications.

Other options include the adding of an adhesive to the blister tray itself and having a cohesive bond between the blister tray and a lidding sheet. An example is U.S. Pat. No. 5,014,851 to Wick. Wick discloses the addition of a cohesive to the blister tray either prior to or after the formation of the blister recesses. In the case of adding a cohesive prior to the formation of the blister recesses, a problem with Wick is that the cohesive could affect the transparency of the blister recess when the blister is formed. Further a problem with having the cohesive within the blister recess area is that it could contaminate the product within the blister recess.

Conversely, in Wick, if the coating is applied after the formation of blister, no system is presented for this. If the process of adding an adhesive through rollers is used on the formed package, the problem with Wick is that a non-uniform coating of adhesive is applied to the shoulders of the blister tray since the blister tray is not completely rigid, thus potentially causing non-uniformity of coating and areas of non-coated shoulders. Further, the cohesive could also leak into the blister recess area under this system.

SUMMARY OF THE INVENTION

The present disclosure overcomes the disadvantages of the prior art providing a system in which a cohesive is printed onto shoulder portions of a blister tray. In particular, a blister tray is inserted into a pallet, thereby providing reinforcement to the blister tray for proceeding through a process in which cohesive can be applied to the shoulder portion only of the blister tray.

In the present disclosure, a print coded foil backed paper is preferably used as a lidding sheet and the adhesive selected for the blister tray is adapted to provide a cohesive bond with a coating with a high affinity for the cohesive or pressure sensitive adhesive on the print coated foiled paper.

In a further embodiment of the present disclosure, a release coat can be applied to a pallet prior to a blister tray being inserted therein, thereby providing for a release coat on a side of the blister tray to allow stacking of the blister tray for transportation to the customer and subsequent ease of separation.

A method and system utilizing a pallet to transport a formed blister to add an adhesive layer is provided. These and other embodiments will be described in more detail below with reference to the drawings.

The present disclosure therefore provides a system for providing adhesive to a pre-formed blister tray having shoulders and recesses between said shoulders, the system comprising: at least one pallet, each pallet of the at least one pallet having with holes to accommodate recesses within the blister tray and support for the shoulders of the blister tray; a pallet loading station for loading the pallet with the pre-formed blister tray; a printer unit for printing adhesive to the shoulders of the blister tray; a drying station for drying the adhesive; and an unloading station for unloading blister trays with adhesive printed on the shoulders thereof.

The present disclosure further provides a method for printing onto a shoulder area of a blister tray, the blister tray comprising the shoulder area and recesses there between, the method comprising: inserting the blister tray into a pallet configured to support the shoulders of the blister tray; printing an adhesive onto the shoulder area of the blister tray; drying the adhesive; and removing the blister tray from the pallet.

The present disclosure further provides a method for printing onto a shoulder area of a blister tray, the blister tray comprising the shoulder area and recesses there between, the method comprising: inserting the blister tray into a pallet configured to support the shoulders of the blister tray; printing an adhesive onto the shoulder area of the blister tray; drying the adhesive; and removing the blister tray from the pallet.

BRIEF DESCRIPTION OF THE DRAWINGS

The present disclosure will be better understood with reference to the drawings in which.

DETAILED DESCRIPTION OF THE INVENTION

Figure 1:
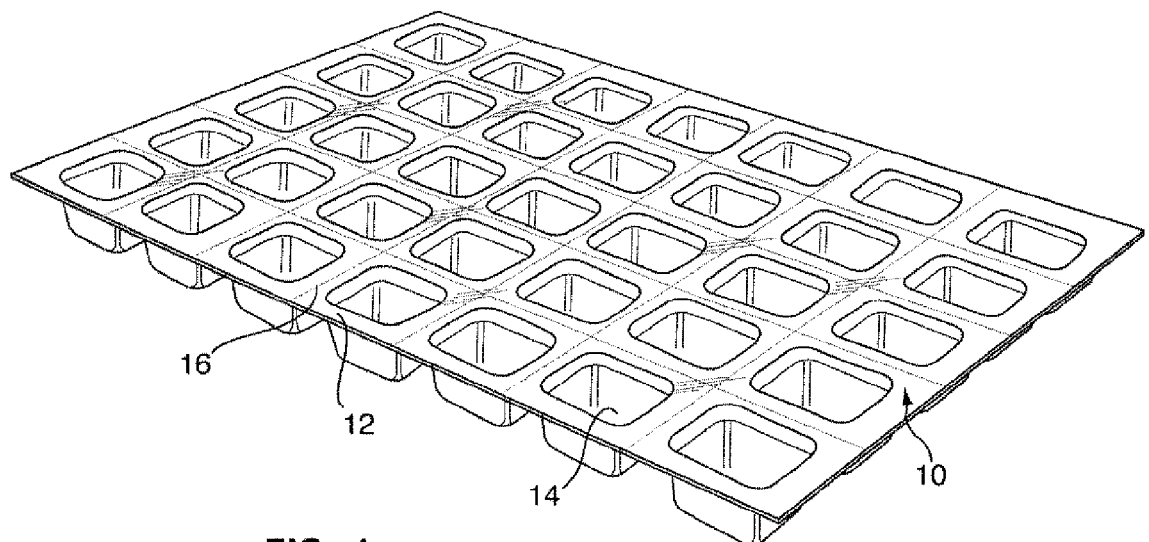
FIG. 1 is a front perspective view of a typical blister tray.

Reference is now made to FIG. 1. FIG. 1 illustrates an exemplary blister tray 10 for use with the present systems and methods.

Blister tray 10 comprises a clear plastic sheet adaptable to be formed into a series of recesses 14 between shoulders 12. As will be appreciated by those skilled in the art, recesses 14 can form a uniform pattern throughout the blister tray 10, as seen in FIG. 1, or can be formed of various sizes and configurations. The present disclosure is not meant to be limited to any particular number or configurations of recesses 14.

In the example of FIG. 1, perforations 16 can be provided between recesses 14 thereby providing the ability to tearaway a particular recess portion from the remainder of blister tray 10.

The clear plastic sheet of blister tray 10 can be formed of any suitable transparent thermoplastic polymer and examples include: polyvinyl chloride or polyethyleneterepthalate. Such a thermoplastic polymer can be thermoformed or die molded to form recesses 14.

As illustrated in FIG. 1, shoulders 12 form a substantially planar surface.

Figure 2:
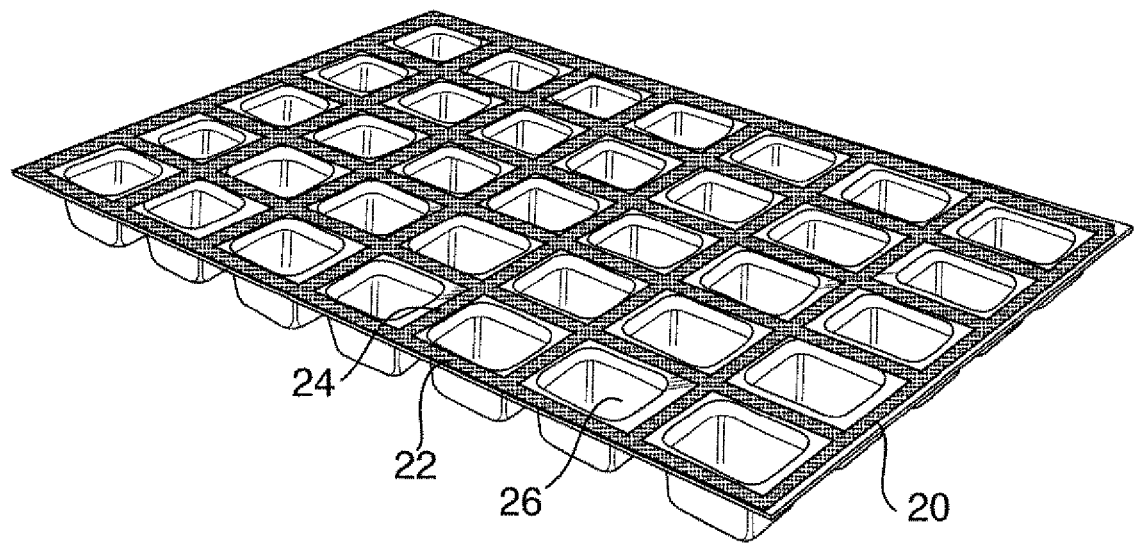
FIG. 2 is a front perspective view of a typical blister tray having an adhesive applied to the shoulders thereof.

Reference is now made to FIG. 2. FIG. 2 shows a blister tray 20 similar to that of blister tray 10 of FIG. 1. In FIG. 2, an adhesive 22 has been applied to shoulders 24 utilizing a printing process described in detail below. As illustrated in FIG. 2, recesses 26 are avoided with the printing process for adhesive 22 thereby preventing contamination of recesses 26 with the adhesive 22. Suitable adhesives include cohesives and pressure sensitive adhesives.

As is described below, adhesive 22 is adapted to cohesively bind to a lidding sheet. In particular, in one embodiment, the lidding sheet is formed of a print coated foil backed paper having a cohesive on the foil. The adhesive is adapted to cohesively bind to the cohesive. Other liddings, however, would be known to those skilled in the art in the present disclosure is not meant to be limited by a particular lidding sheet. The lidding can be supplied in sheet or roll form.

Figure 3:
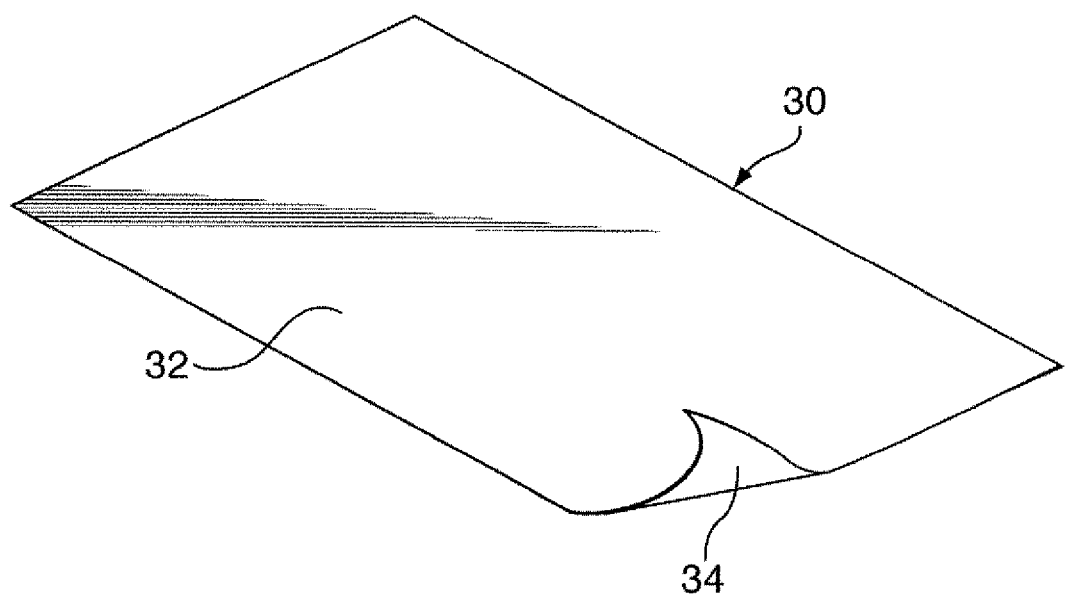
FIG. 3 is a front perspective of a lidding sheet.

Reference is now made to FIG. 3. FIG. 3 shows one embodiment of a lidding sheet adapted to be bonded to the blister tray of FIG. 1 or 2. As shown in FIG. 3 lidding sheet 30 includes a foil surface 32 a printing surface 34 and may include a cohesive layer on surface 32.

Foil surface 32 is either provided with a coating with a high affinity for the cohesive or pressure sensitive adhesive, which is inert and has no adhesive properties on its own or with a co-adhesive coating that adheres to its respective co-adhesive. Such coatings include any high energy polymer such as an acrylic that is not affected by the heat properties of a typical printer. Other coatings would be known to those in the art.

Printing surface 34 is adapted to receive printing. For example, lidding sheet 30 could be sent through a standard printer thus allowing the printing of information on printing surface 34 to be customized for the particular application of the blister packaging, or even individualized for a particular user.

As will be appreciated by those skilled in the art, by having a lidding sheet 30 without any adhesive on it, transfer of adhesive to a printer is avoided.

In alternative embodiments, instead of a lidding sheet 30, a roll could be utilized having similar properties. Further in similar situations, a printing surface 34 could be avoided if printing is not required.

The lidding sheet 30 is preferably made of a thin material that prevents moisture and air from entering into recesses 14 or 26 from FIG. 1 or 2.

In operation, the blister tray 10 of FIG. 1 can be combined with lidding 30 of FIG. 3. In particular, the entity that is filling blister tray 20 could fill recesses 14 with the desired materials, such as pharmaceuticals, electronics, contact lenses, among others, and then place lidding sheet 30 from FIG. 3 onto blister tray 20 such that foil surface 32 comes into contact with shoulders 24. Light pressure on lidding 30 causes a cohesive bond in time between the lacquer on foil surface 32 and an adhesive 22 from FIG. 2.

Prior to the placing of lidding 30 onto blister tray 20 the entity filling the blister tray 20 could place lidding 30 through a printer in order to customize information for an end user. As illustrated above, the combination of lidding 30 with blister tray 20 creates hermetically sealed recesses 26 in which materials are protected from air or water contamination. Further, by avoiding adhesive within recess 26, the material placed within recess 26 is not contaminated by the adhesive 22, nor is the blister tray 20 damaged. As will be appreciated by those skilled in the art, having adhesive 22 within recess 26 could cause contamination problems, but also problems with the opaqueness of recess 26. This could be critical, for example, in pharmaceutical applications where it is important that an end user be able to see the medications within blister tray 20.

As will further be appreciated, by having a thin lidding sheet 30 access is facilitated to recess 26. By avoiding having a thick lidding surface 30, access techniques such as perforations are not required. Perforations could cause loss of hermetic seals, which could affect the contents of recess 26.

The above blister tray with an adhesive printed on the shoulder portion only can be formed in accordance with a method and system as described in reference to FIGS. 4 to 18 below. The process and methods of FIGS. 4 to 18 are meant to be examples only and can be varied based on the requirements of the blister tray application.

Figure 4:
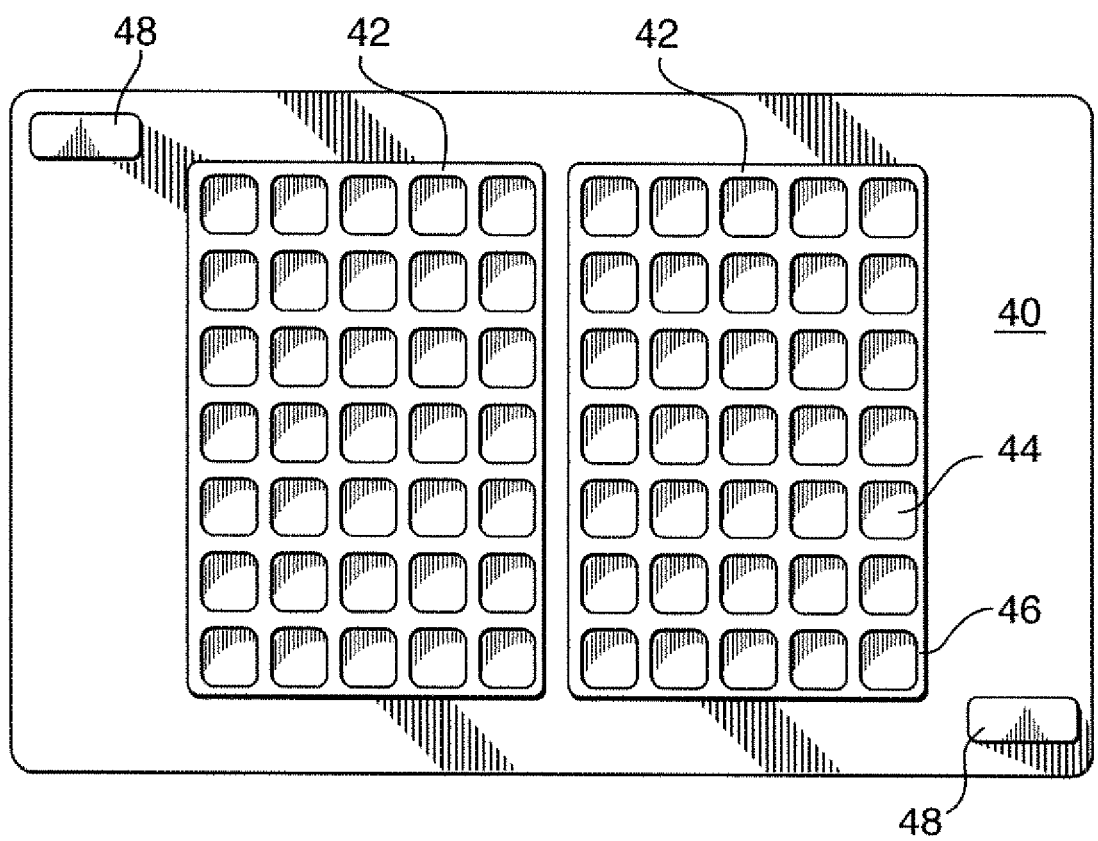
FIG. 4 is a top plan view of a pallet.

Reference is now made to FIG. 4. FIG. 4 illustrates a pallet adapted to be used in accordance with one embodiment of the present disclosure.

A pallet 40 is, in the embodiments of FIG. 4, a substantially rectangular tray dimensioned to fit on a conveyer system as described below.

In the embodiment of FIG. 4, two receptacle portions 42 are provided. Each receptacle portion 42 has a series of holes 44 configured to accommodate a recess of a blister tray, such as recess 14 of blister tray 10 of FIG. 1. Hole 44 is, one embodiment, of uniform circumference throughout the depth of pallet 40.

A proud area 46 is provided on the surface of the pallet 40 and adapted to rest under a blister tray when a blister tray is inserted into receptacle portion 42.

A sensor element such as a metal plate 48 can be provided on pallet 40 to provide an indication when pallet 40 is correctly positioned. However, in other embodiments other position sensing means could be utilized beside a metal plate 48.

Figure 5:
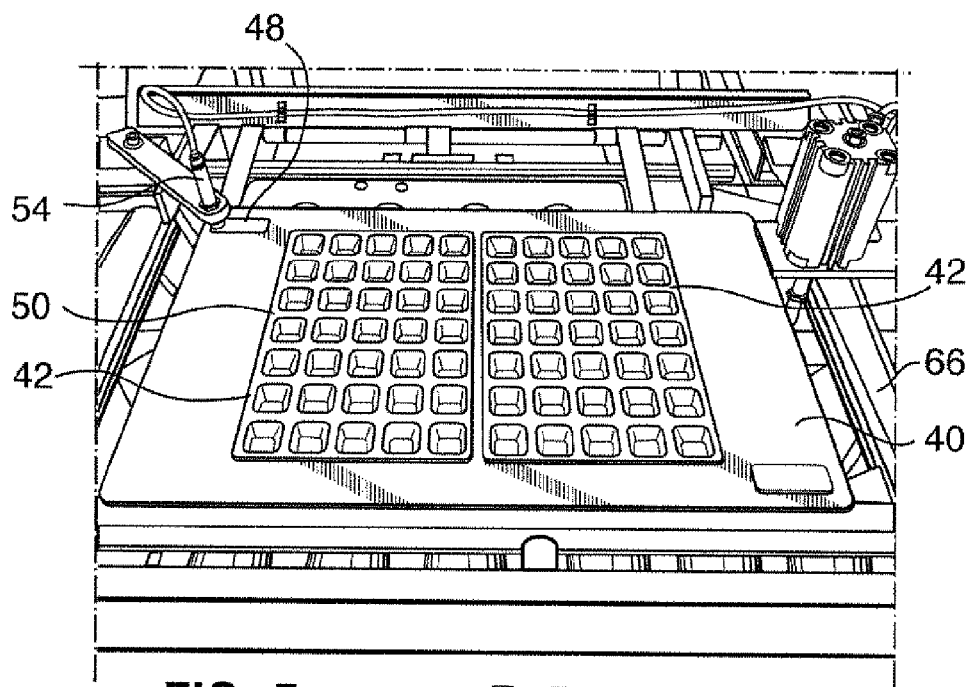
FIG. 5 is a front perspective view of a pallet stopped at a transfer station.

Reference is now made to FIG. 5. FIG. 5 shows pallet 40 from FIG. 4 with a blister tray 50 inserted such that blisters are within each receptacle portion 42. As illustrated, a sensor 54 is adapted to sense metal plate 48 to stop pallet 40 in the correct position in order to load blister tray 50.

The use of a pallet 40 to support a blister tray 50 provides various advantages. Pressure can be applied to blister tray 50 without blister tray 50 deforming, thereby enabling the printing of an adhesive onto the shoulders of blister tray 50. Further, as described in more detail below, the use of a top coating 46 that has proud surface allows for the addition of a release coat to the lower surface of the blister tray 50.

Figure 6:
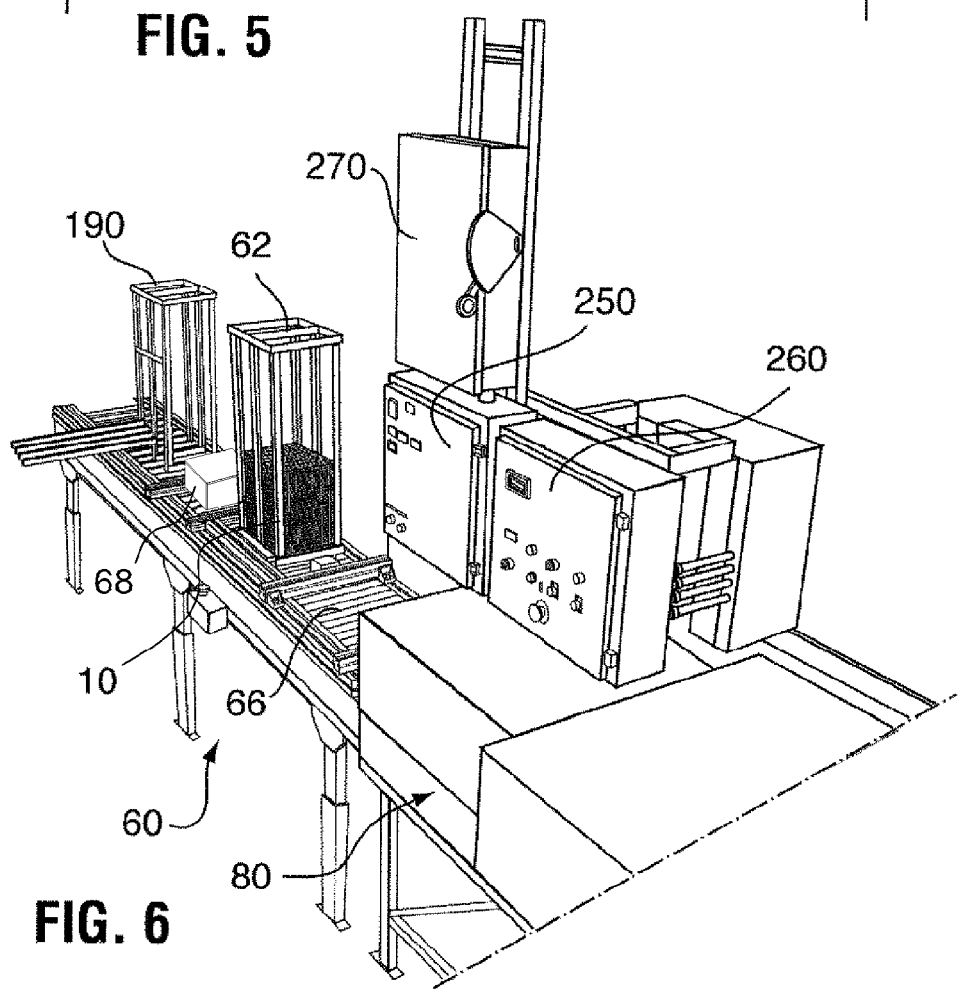
FIG. 6 is a front perspective view of a portion of a coating line showing a pallet loader and a printing unit.

A machine adapted to utilize pallet 40 is illustrated with reference to FIG. 6. FIG. 6 illustrates an adhesive application line 60 having a blister tray loader 62. Blister tray loader 62 is illustrated with reference to FIGS. 7 and 8 below.

Figure 7:
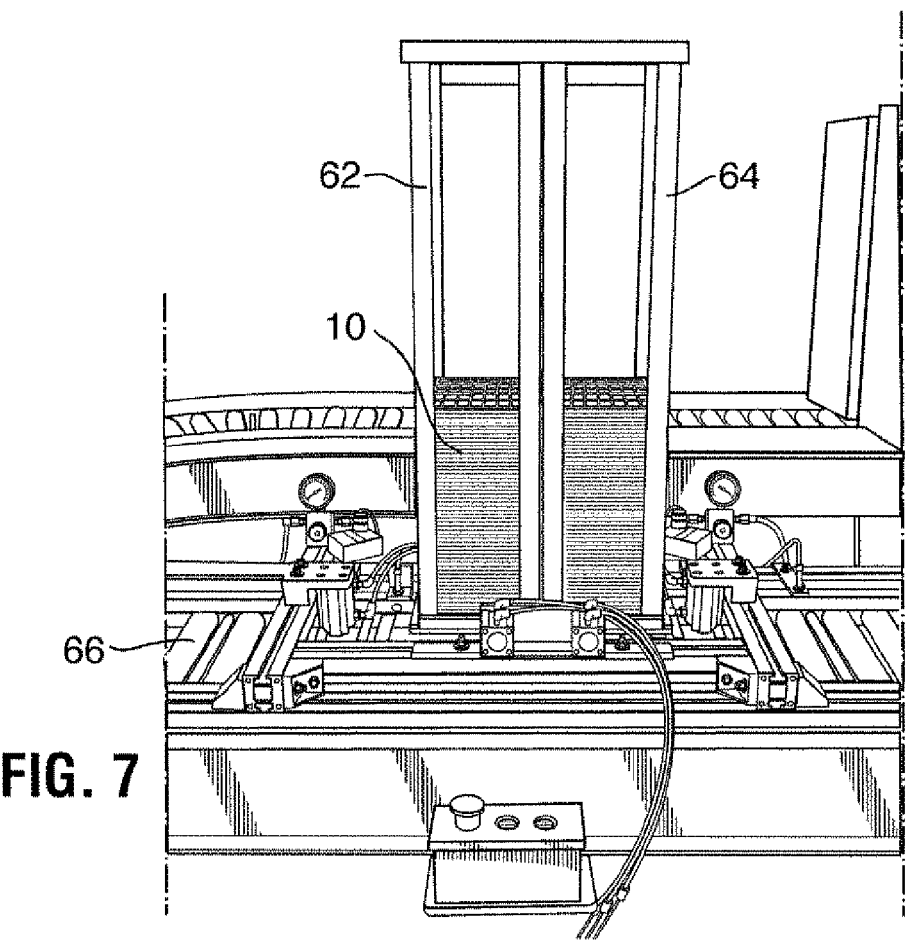
FIG. 7 is a front perspective view of a loading unit.

With reference to FIG. 7, blister tray loader 62 contains a tray hopper 64. If pallet 40 is used then, as illustrated in FIG. 7, tray hopper 64 has two hoppers adjacent to each other in order to load blister trays into both receptacle portions 42. However, as will be appreciated by those skilled in the art, this configuration is not meant to be limiting and other configurations could be adapted to specific uses. For example, four receptacle portions could exist within a pallet 40 and in this case, blister tray hopper 64 would include four portions to store blister trays.

As will further be appreciated by those skilled in the art, the blister trays in hopper 64 are uncoated, preformed blister trays such as blister trays 10 from FIG. 1.

In operation, a pallet 40 is conveyed along conveyer 66 until a sensor 54 (seen in FIG. 5) senses that the pallet 40 is in the correct position. At this point, conveyer 66 stops.

Figure 8:
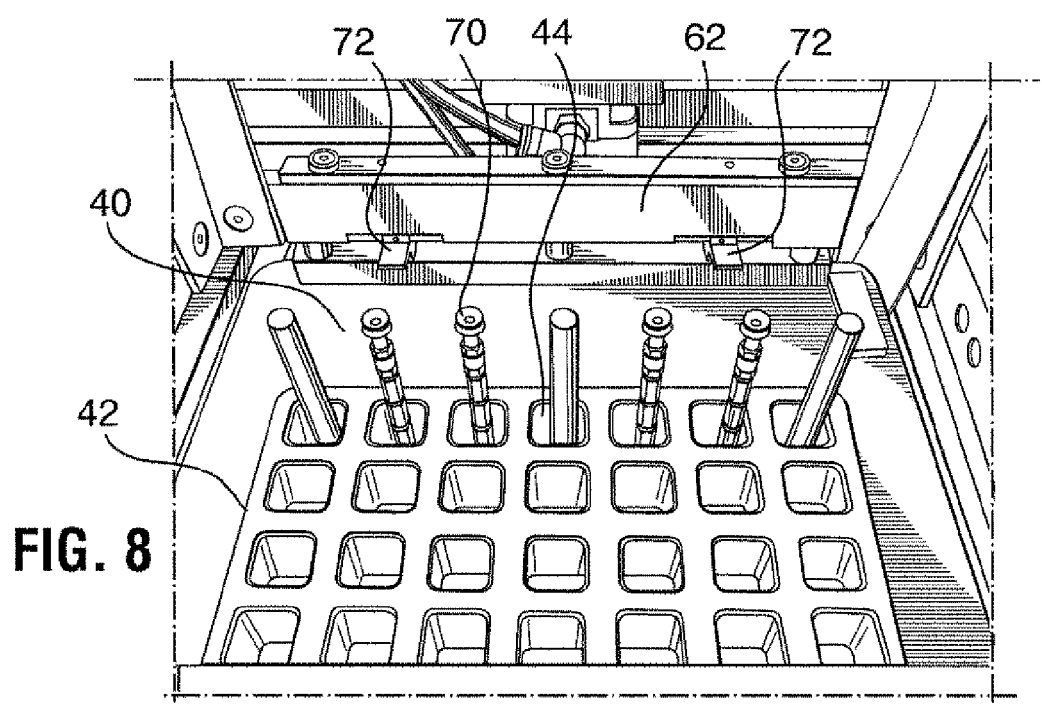
FIG. 8 is a front perspective view of a pneumatic blister tray loading apparatus.

Reference is now made to FIG. 8. In FIG. 8 suction heads 70 are projected upward through holes 44 in pallet 40. As illustrated, suction heads 70 are able to apply a pneumatic suction force to a blister tray. Once such a connection has been made, suction heads 70 retract, pulling a blister tray into position within receptacle 42.

In operation, in one embodiment suction heads 70 will exist for both receptacle portions 42 in pallet 40. However in alternative arrangements pallet 40 could be advanced after loading a first blister tray 10 in order to load additional blister trays 10.

In one embodiment, blister trays 10 include a space formed by a ridge on recess 14. In this embodiment, a barrier could be inserted within the gap between blister trays 10 during the loading of blister trays 10 into receptacle 42 of pallet 40. As will be appreciated, if the barrier is placed between the bottom blister tray and the second last blister tray this will prevent more than one blister tray from being loaded into a pallet 40. Such a mechanism is illustrated with reference to barrier 72 in FIG. 8.

Figure 9:
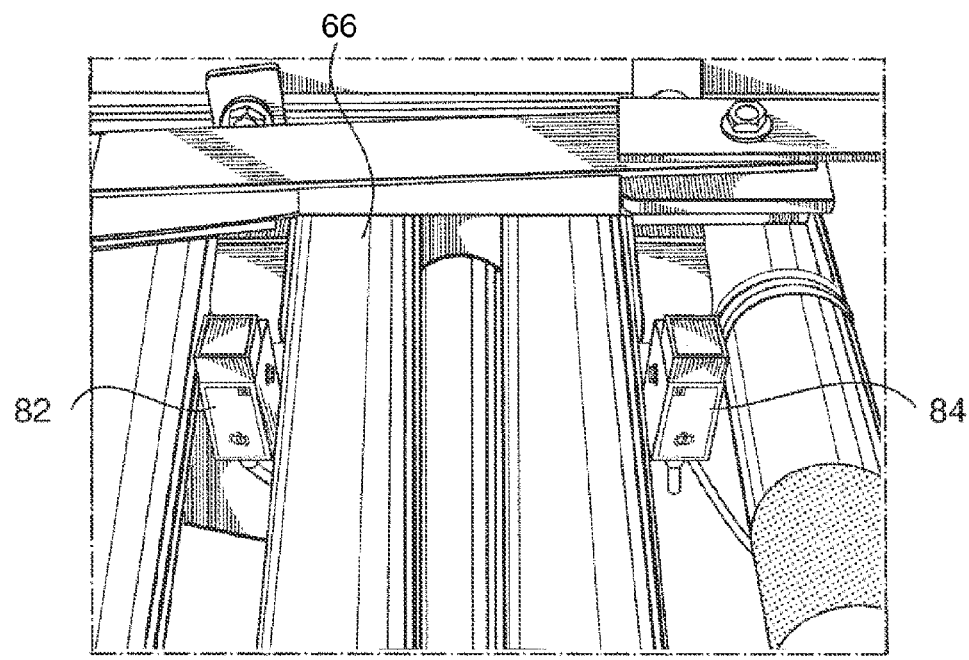
FIG. 9 is a front perspective view showing sensor's for detecting whether a blister tray has been loaded.

Referring again to FIG. 6, pallet 40 then is conveyed along conveyer 66 into printing unit 80. Prior to entering printing unit 80, a conveyer 66 could include sensors for ensuring that blister tray 10 was properly loaded into pallet 40. Reference is now made to FIG. 9.

In FIG. 9, conveyer 66 includes sensors 82 and 84 adapted to sense whether a pallet 40 has properly been loaded with a blister tray 10. In one embodiment, sensors 82 and 84 are photoelectric switches that will detect whether there is a blister tray 10 in place.

In one embodiment, sensors 82 and 84 are located such that the pallet 40 stops directly over these sensors when a further pallet is being loaded under hopper 62 from FIG. 7.

Figure 10:
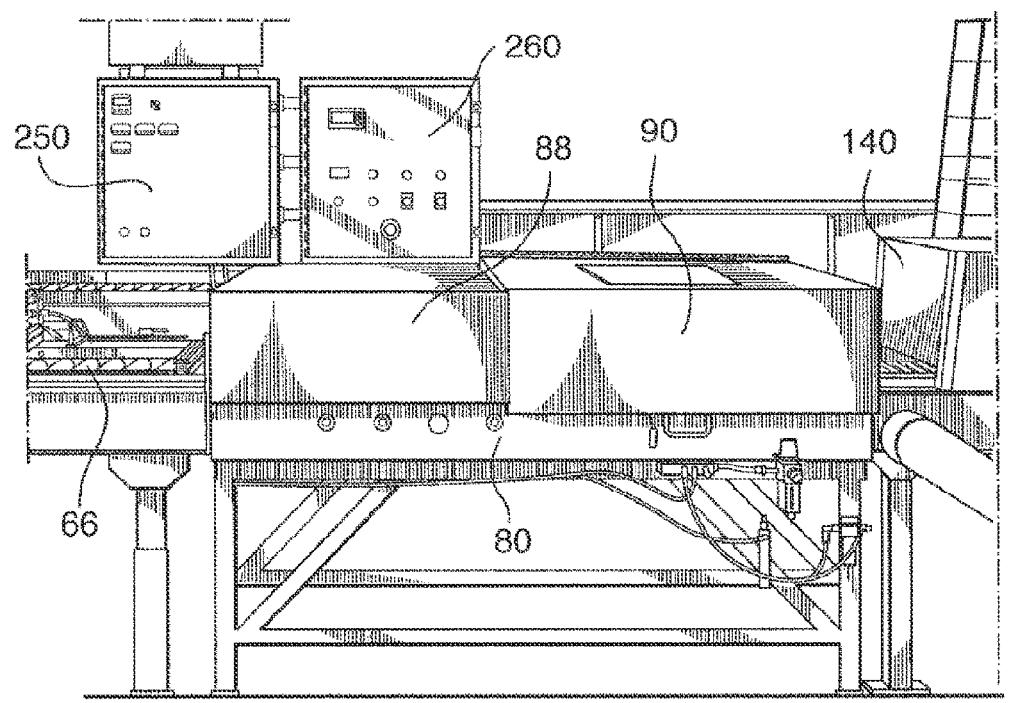
FIG. 10 is a front perspective view of the printing unit.
Figure 11:
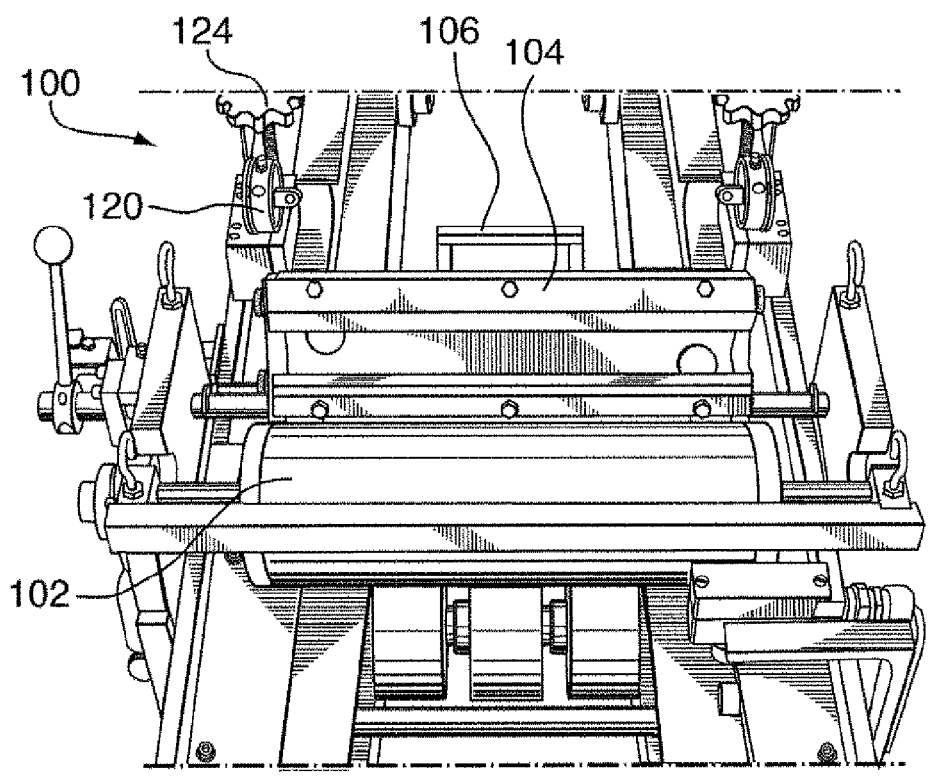
FIG. 11 is a top perspective view of a coating head.
Figure 12:
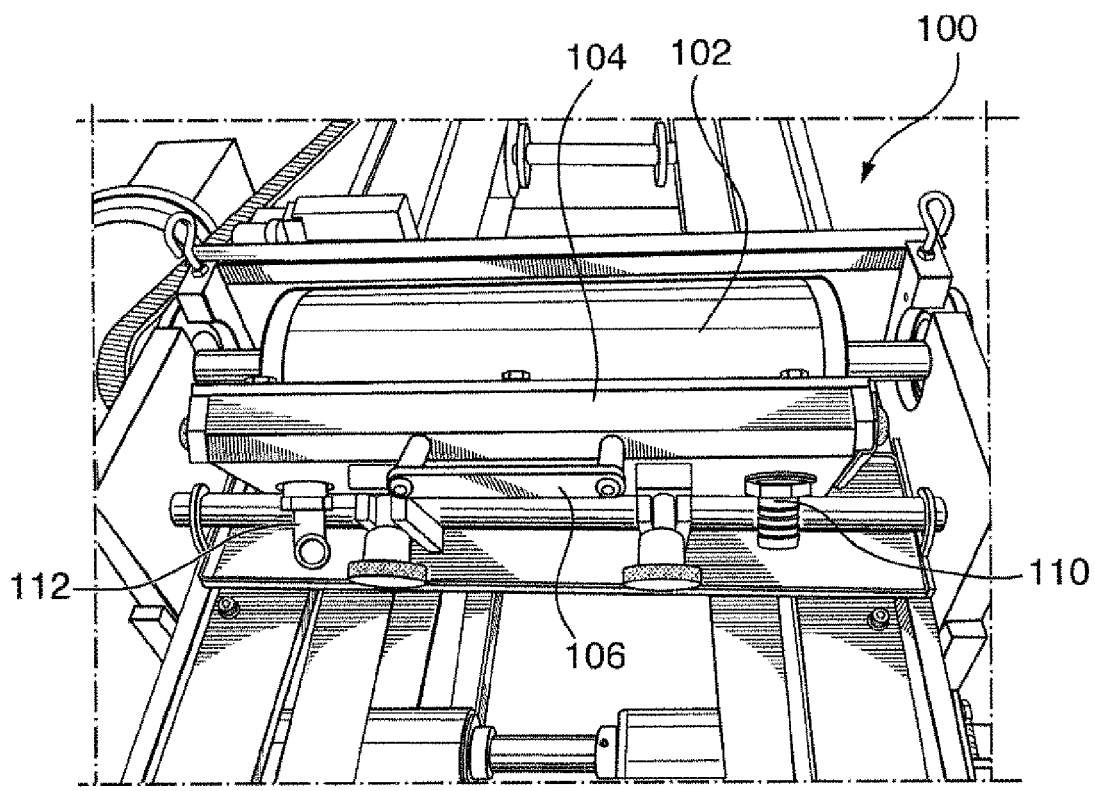
FIG. 12 is a front perspective view of a coating head.

Reference is now made to FIG. 10. FIG. 10 illustrates one embodiment of a printing unit 80. In particular, gravure printing unit 80 comprises an initial section 88 and a section 90 containing the coating head. Referring to FIGS. 11 and 12, coating head 100 is shown from the top and front. Coating head 100 comprises an application roller 102 adapted to be coated with an adhesive and further adapted to apply the adhesive to a blister tray 10.

An adhesive applicator 104 is shown in an open position. In operation, adhesive applicator 104 is closed. As shown in FIG. 12 inlet 110 is provided to allow adhesive to be applied to roller 102 and an outlet 112 is provided to receive excess adhesive fluid.

Referring again to FIG. 11, a gauge 120 is adapted to determine the height of a pallet and a blister tray, allowing adjustment of the appropriate height of the roller 102 utilizing a handle 124.

Figure 13:
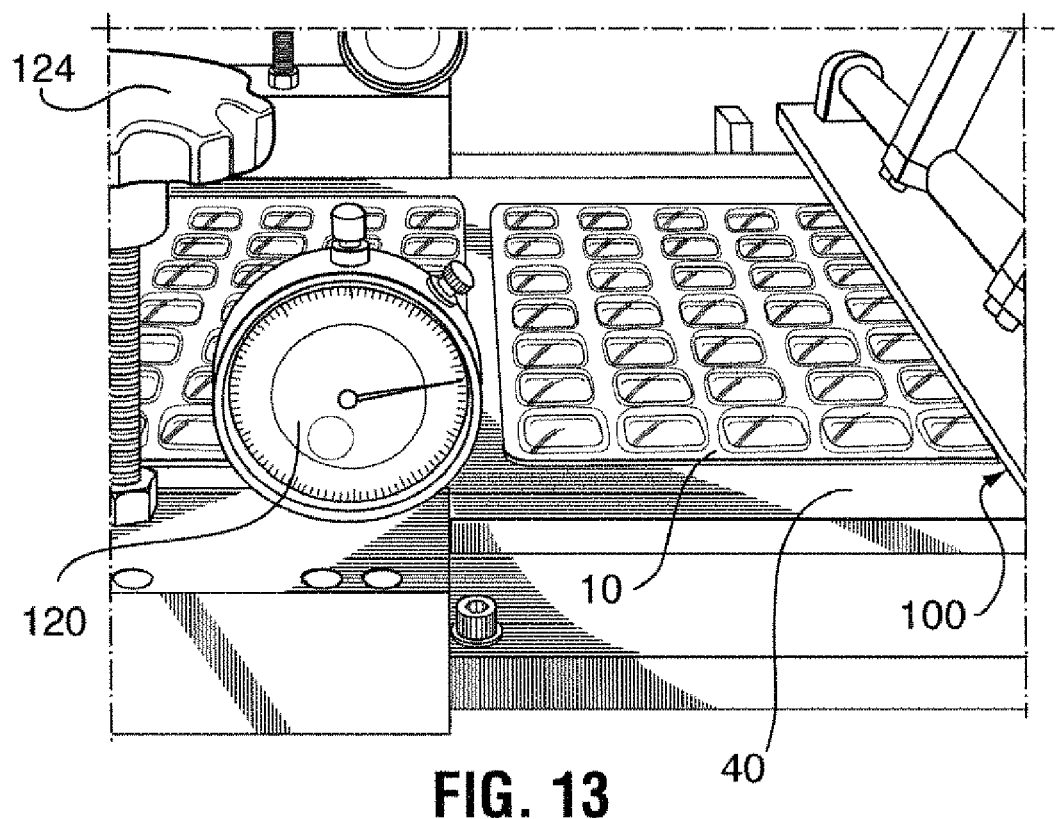
FIG. 13 is a front perspective view of a deflection gauge.

In FIG. 13 gauge 120 and handle 124 are shown in more detail with a pallet 40 and a blister tray 10 proceeding into the coating head 100.

As will be appreciated by those skilled in the art, the use of a roller 102 to apply pressure to a pallet 40 and a blister tray 10 allows for coating of the shoulders only. Excess adhesive does not need to be put on to a roller 102 and thus contamination into a recess 14 from FIG. 1 does not occur.

In other embodiments, various types of printers can be utilized, including but not limited to: gravure, flexo, offset, knife over roll, air-knife, reverse gravure, among others.

Figure 14:
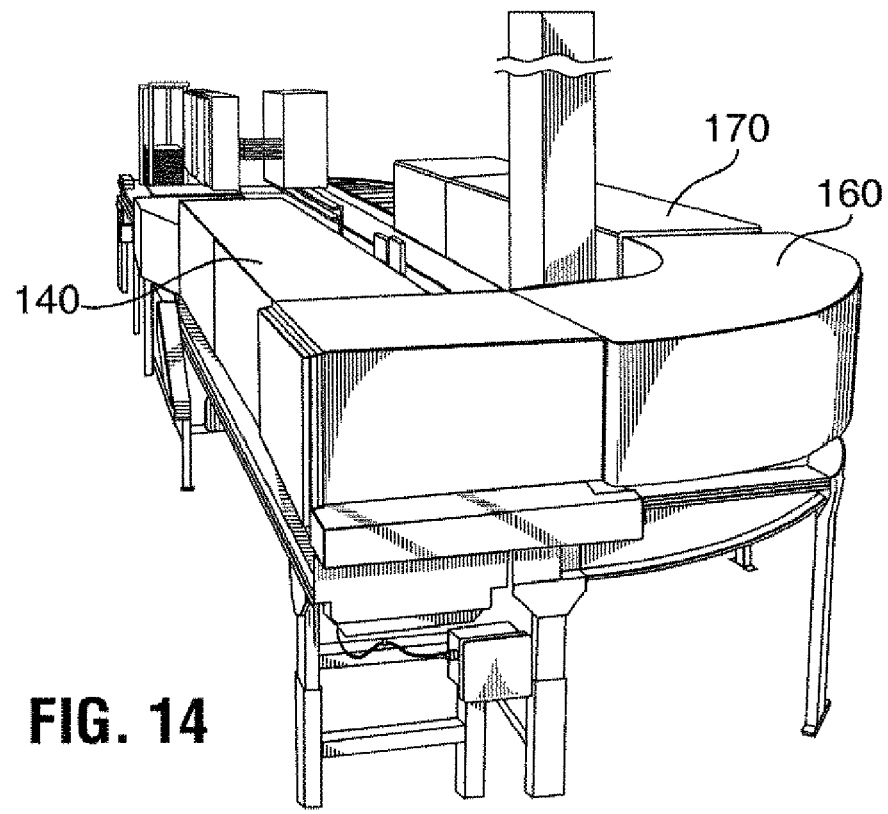
FIG. 14 is a perspective view of three drying units.

Once the adhesive has been applied to the shoulders of a blister tray 20 then the blister tray next proceeds to heating and drying unit. Reference is now made to FIG. 14. FIG. 14 illustrates a perspective view of the various heating and drying units in the embodiment of the present disclosure.

In FIG. 14 a pallet 40 (from FIG. 4) enters a first straight oven 140, which comprises an initial infrared heating portion.

Figure 15:
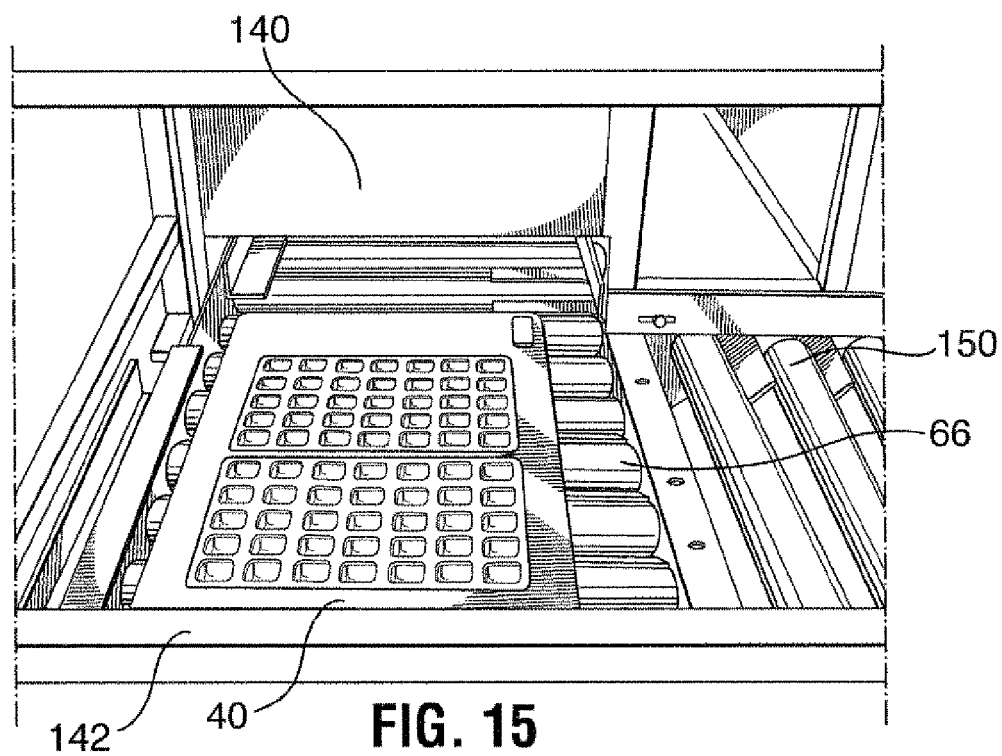
FIG. 15 is a front perspective view of conveyer system in which a pallet changes orientation of travel.

At corner 142 a pallet 40 switches direction of travel. Reference is now made to FIG. 15. FIG. 15 shows corner 142 with the cover removed. As seen in FIG. 15 pallet 40 with blister tray 20 has emerged from first straight oven 140 and has come to the end of conveyer 66.

At this point, pallet 40 is moved to conveyer 150 and proceeds to radius oven 160 as shown from FIG. 14.

As will be appreciated by those skilled in the art, conveyer 150 conveys pallet 40 in the other dimension of pallet 40, thereby allowing pallet 40 to proceed more slowly through radius oven 160. In particular, pallet 40 has a longer dimension to travel along conveyer 66 and a shorter dimension traveling along conveyer 150. This allows a longer drying time in radius oven 160.

Referring again to FIG. 14, once pallet 40 emerges from radius oven 160 it proceeds through a further straight oven 170 to complete the drying process.

In one embodiment, ovens 140, 160 and 170 provide for infrared heating of adhesive on blister tray 20 and further provide for the movement of air over blister tray 20 to facilitate the drying of adhesive 22.

Figure 16:
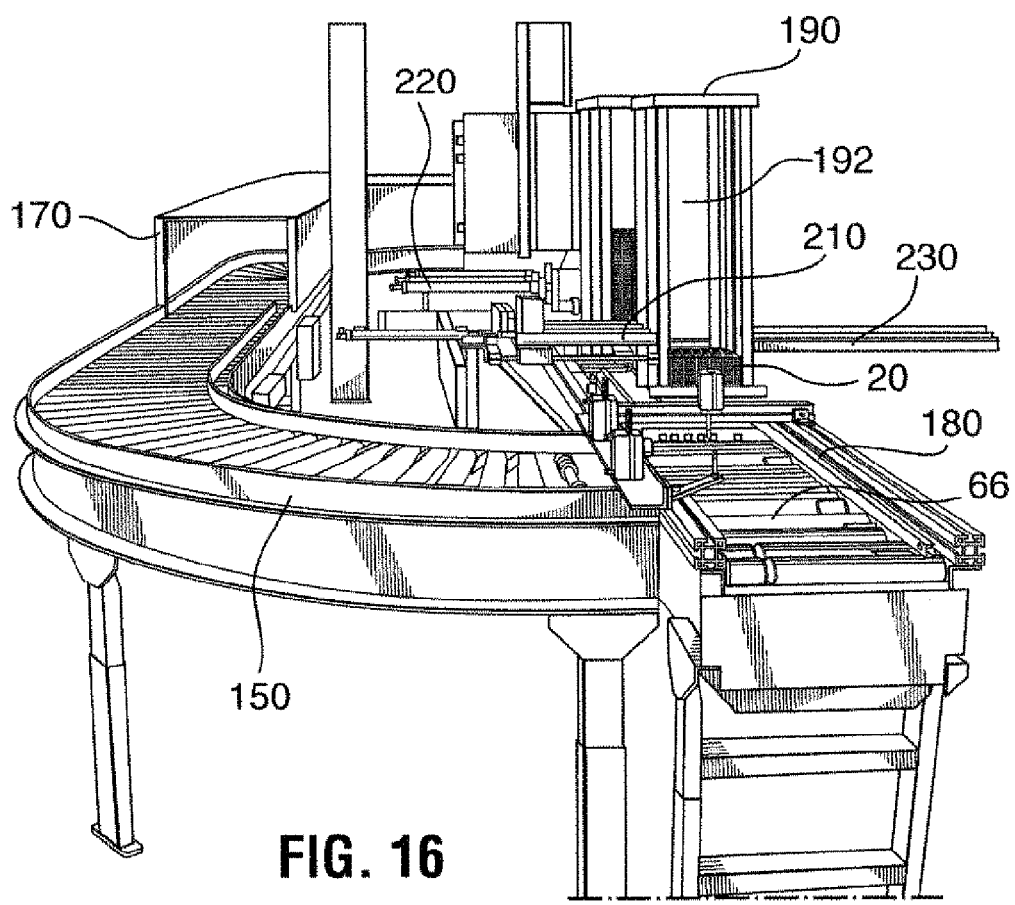
FIG. 16 is a perspective view of the coating line.

Referring to FIG. 16, once pallet 40 (not shown) emerges from straight oven 170 it is conveyed back to a corner 180 to provide for a change of direction of the pallet. The pallet is then conveyed under unloading unit 190 to unload the coated blister trays 20. Unloading unit 190 includes hoppers 192 to store coated blister trays 20.

Figure 17:
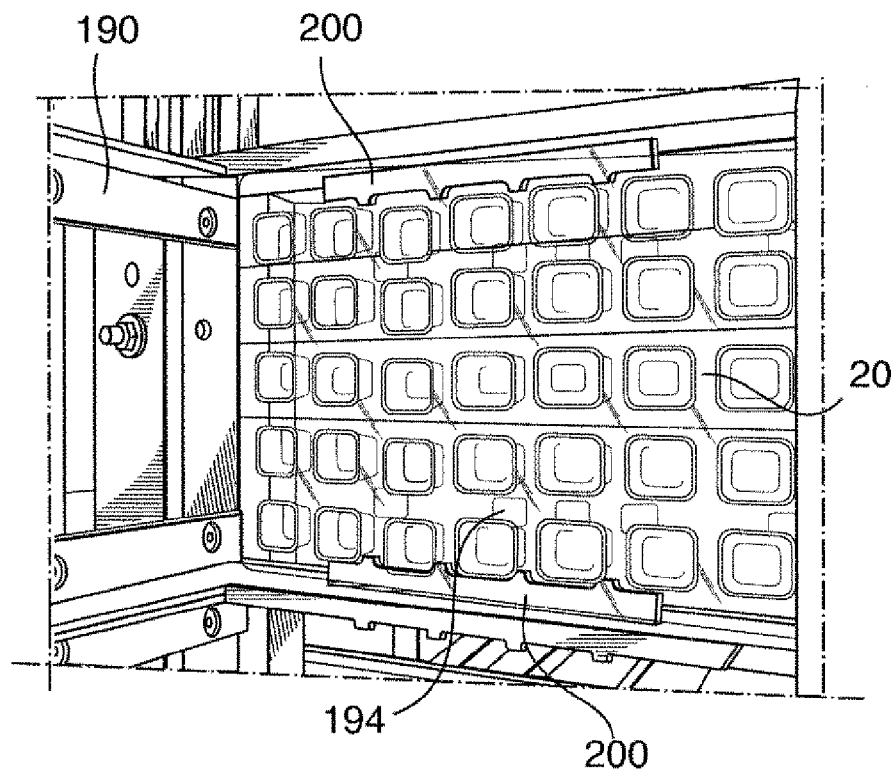
FIG. 17 is a top perspective view of a pallet unloading station.

Reference is now made to FIG. 17. FIG. 17 shows a front perspective view of unloading unit 190 showing a blister tray being pushed into hopper 192. This is accomplished utilizing lift rods 194 as seen through blister tray 20.

Hinges 200 are provided on either side of hopper 192. Hinges 200 are adapted to allow the blister tray 20 to be inserted up but do not allow a blister tray to fall below the hinges once the hinges return to their extended position as shown in FIG. 17.

Figure 18:
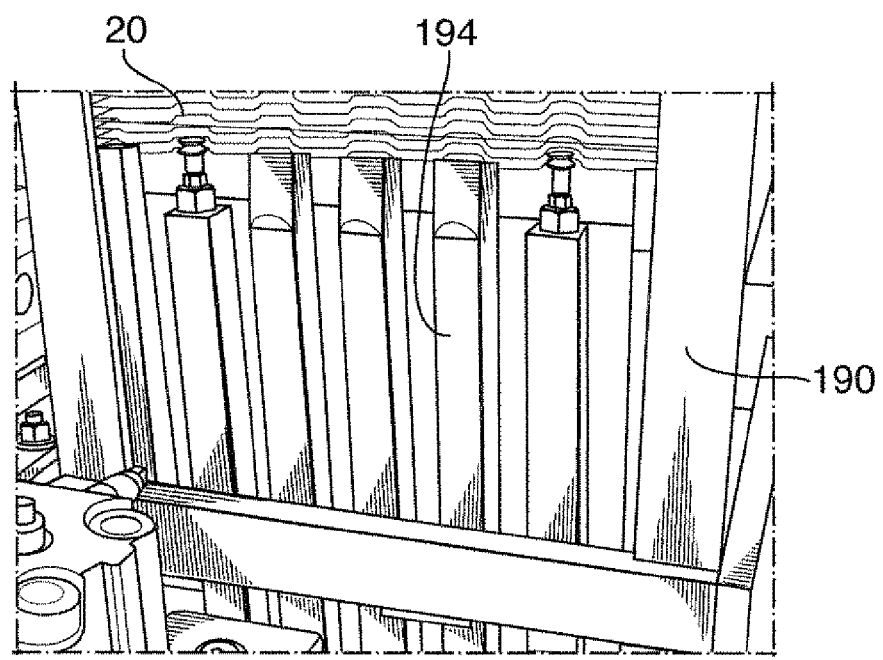
FIG. 18 is a side perspective view of a pallet unloading station in which blister trays are being unloaded from the coating line.

In one embodiment, a count is kept of the number of blister trays 20 that are within unloading unit 190. Once a predefined number of units are loaded into unloaded unit 190 the units can then be transferred. Reference is now made to FIG. 18.

In FIG. 18, lift rods 194 are adapted to raise the entire stack of blister trays 20 to a second position. Once the blister trays are in a second position, an under mount rail 210 as best seen in FIG. 16 is pushed under the stack of blister trays 20. Under mount rail 210 is preferably moved into place through a pneumatic or hydraulic actuator.

A push rod 220 is adapted to push the entire stack onto a rail 230 from which an operator can load the blister tray stack into boxes for shipping.

In a further embodiment, it is advantageous to add a release coating to the bottom of blister tray 10 from FIG. 1. As will be appreciated by those skilled in the art, a release coating allows stacking of blister trays without any adhesion of adhesive to the bottom of the stack. Suitable release materials include typical low energy polymers as used by industry.

Reference is now made to FIG. 6. As will be appreciated to those skilled in the art, release coatings can be added prior to the forming of the blister tray by coating the flat sheets prior to thermoforming. Alternatively, pre-release coated materials exist and can be utilized to form a blister tray. However, in some embodiments it is advantageous to add the coating during the manufacturing process.

From FIG. 6, unloading apparatus 190 unloads coated blister trays from pallets 40 (from FIG. 4). At this point an empty pallet travels to loading hopper 62.

In one embodiment, the empty pallet is checked prior to arriving at loading hopper 62 to verify that blister trays 20 were unloaded at unloading apparatus 190. This could be done by stopping the empty pallet 40 over sensors similar to sensors 82 and 84 from FIG. 9.

In an embodiment in which a release coating needs to be added, a station 68 can be inserted between unloading apparatus 190 and loading hopper 62. This station would provide a coating onto pallet 40. Specifically, referring to FIG. 4, a top coating 46 of pallet 40 is preferably a proud resilient material such as rubber. This material could be coated with a release prior to the pallet 40 reaching loading hopper 62. In this case a blister tray 10 is inserted into a coated pallet 40 and proceeds into printing unit 80.

The pressure provided by the coating head also pushes blister tray 10 into pallet 40 thereby providing a release coating to the underside of blister tray if applied 10. Further by proceeding through dryers 140, 160, and 170 the release coating is also dried. Thus, when the pallet arrives back at the unloading apparatus 190 both the upper surface and the lower surface of blister tray 20 are coated. Specifically, the upper surface of blister tray has the adhesive while the lower tray surface of blister tray 20 has the release.

As will be appreciated by those skilled in the art, various controls need to exist on a coating line 60. Such controls include emergency stops, checks to see whether the pallet is loaded and unloaded at proper points, checks to see whether the adhesive is being applied correctly and with correct pressure, counting mechanisms to count the number of blister trays coated, among others. These can be controlled by a central control panel such as that illustrated in FIG. 6. In FIG. 6, control units 250, 260 and a power box 270 are provided to provide electrical, pneumatic, hydraulic or other controls as required by coating line 60.

In operation, a pallet 40 is positioned under loading unit 62 and receives, in the example of the pallet of FIG. 4, two blister trays. The pallet then proceeds into printing unit 80 in which it receives an adhesive on its shoulders only. If a release is also added to pallet 40 then the pressure in the printing unit 80 causes release to be bonded to the lower surface of the blister tray.

The pallet then proceeds to corner 142 where it changes direction and proceeds through dryers 160 and 170. This allows the pallet to be exposed to the heat and airflow of dryers 160 and 170 for a longer period of time.

The pallet then proceeds back to corner 180 where it changes direction again and proceeds under unloading apparatus 190 where the blister trays are unloaded from pallet 40.

When unloading unit 190 has a certain number of blister trays can be removed from the unloading unit by raising the blister trays, inserting a rail 210 and using a piston 220 to push the blister trays onto a rail 230 for shipping.

A customer will then receive the coated blister trays and a foil-coated paper-lidding unit. These can be assembled by printing any information desired onto the foil coated paper lidding and placing the lidding in a correct position over the coated blister tray.

Light pressure will cohesively bond the blister tray to the lidding since the adhesive on the blister tray is adapted to bond to a coating on the foil. The assembled unit can then be provided to the end user.

In alternative configurations, instead of a cohesive bond, a pressure bond could be utilized. In this case, equipment may be required to bond, using pressure, the lidding onto the blister tray.

As will be appreciated by those skilled in the art, the use of the pallets through the process allows for the coating of the shoulders only without any contamination of the adhesive into the recesses of the blister tray, thereby preventing contamination of the product that is placed into the recesses, clouding of the blister tray or other aversive effects. This is done by allowing pressure to be applied to the blister tray without deforming the blister tray.

Various alternatives to the above exist. In certain embodiments, the loading unit could work by mechanical rather than pneumatic section means. Other alternatives would be known to those skilled in the art.

The configuration for the dryers could be varied. For example, instead of having a pallet change direction to go through a dryer more slowly, a further dryer could be added and the pallet could proceed in it's original orientation. Further, other drying techniques than infrared, forced hot air and fans are contemplated to be within the scope of the present disclosure.

Variations could further exist in the printer, unloader, conveyer and other aspects of the manufacturing process.

In certain embodiments, blister trays could be printed with a pressure or thermal adhesive instead of a cohesive bond. Further, even in the case of the use of a cohesive bond, varied lacquers and adhesives could be utilized.

FIGS. 1 to 18 provide for one embodiment. However, as will be appreciated by those skilled in the art, modifications could be made without changing the nature of the present disclosure.

What is claimed is:

1. A system for providing adhesive to a pre-formed blister tray having shoulders and recesses between said shoulders, the system comprising:
   at least one pallet, each pallet of the at least one pallet having holes to accommodate recesses within the blister tray and support for the shoulders of the blister tray, allowing pressure to be placed on the shoulder of the blister tray without deforming the recesses of the blister tray;

a pallet loading station for loading the pallet with the preformed blister tray;

a printer unit for printing adhesive to the shoulders of the blister tray;

a drying station for drying the adhesive while the recesses of the blister tray are unsealed; and an unloading station for unloading the unsealed blister tray with adhesive printed on the shoulders thereof.

2. The system of claim 1, wherein the printer unit is selected from the group consisting of a gravure printer;

a flexo printer; an offset printer; a knife over roller printer; an air-knife printer; and a reverse gravure printer.

3. The system of claim 2, wherein the adhesive is one of: a co-adhesive coating; thermal adhesive; and a pressure adhesive.

4. The system of claim 1, wherein the pallet further comprises a proud area.

5. The system of claim 4, further comprising a coating station between the unloading station and the loading station for coating the proud area with a release coating.

6. The system of claim 5, wherein pressure provided at the printer unit is configured to coat an underside of said shoulders with the release coating.

7. The system of claim 1, wherein the pallet has a first longer dimension and a second shorter dimension.

8. The system of claim 7, further comprising a corner on a conveyer, wherein a direction of travel is changed at the corner from the first longer dimension to the second shorter dimension, thereby increasing travel time of the pallet when traveling along the second shorter dimension.

9. The system of claim 8, wherein the corner occurs within the drying station.

10. The system of claim 1, wherein the loading station comprises a stack of blister trays and a suction head configured to pull one blister tray from the stack of blister trays into the pallet.

11. The system of claim 1, wherein the unloading station comprises at least one lift rod to push the coated blister tray into a stack of coated blister trays.

12. The system of claim 11, further comprising a counter to count a number of coated blister trays within the stack of coated blister trays.

13. The system of claim 11, further comprising a transfer station configured to push the stack of blister trays out of the unloading station once a predetermined number of blister trays are within the stack of blister trays.

14. The system of claim 1, wherein the pallet is configured to accommodate a plurality of blister trays.

* * * * *